(12) United States Patent
Stankewitz et al.

(10) Patent No.: US 10,811,994 B2
(45) Date of Patent: Oct. 20, 2020

(54) MULTIPHASE MULTILEVEL POWER CONVERTER

(71) Applicant: SIEMENS AKTIENGESELLSCHAFT, Munich (DE)

(72) Inventors: Jan Christoph Stankewitz, Nuremberg (DE); Ewgenij Starschich, Wilhermsdorf (DE); Markus Vor Dem Berge, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/603,326

(22) PCT Filed: Apr. 5, 2017

(86) PCT No.: PCT/EP2017/058099
§ 371 (c)(1),
(2) Date: Oct. 7, 2019

(87) PCT Pub. No.: WO2018/184671
PCT Pub. Date: Oct. 11, 2018

(65) Prior Publication Data
US 2020/0044580 A1    Feb. 6, 2020

(51) Int. Cl.
*H02M 7/483* (2007.01)
*H02H 7/12* (2006.01)
*H02M 1/32* (2007.01)

(52) U.S. Cl.
CPC .............. *H02M 7/483* (2013.01); *H02H 7/12* (2013.01); *H02M 1/32* (2013.01); *H02M 2007/4835* (2013.01)

(58) Field of Classification Search
CPC .......... H02M 7/483; H02M 7/12; H02M 1/32; H02M 2007/4835
See application file for complete search history.

(56) References Cited

U.S. PATENT DOCUMENTS

| 4,710,850 | A | 12/1987 | Jahn et al. |
| 8,570,779 | B2 * | 10/2013 | Dommaschk ........... H02M 1/32 363/53 |

(Continued)

FOREIGN PATENT DOCUMENTS

| CN | 103063903 A | 4/2013 |
| EP | 0234368 A1 | 9/1987 |

(Continued)

*Primary Examiner* — Emily P Pham
(74) *Attorney, Agent, or Firm* — Laurence Greenberg; Werner Stemer; Ralph Locher

(57) ABSTRACT

A multi-phase multi-stage power converter includes a phase module having a power converter module formed of two-pole submodules connected in series and having a plurality of semiconductor switches connected in series, an energy store charged and discharged by the semiconductor switches, a bypass switch short-circuiting the energy store upon exceeding a first limit voltage, and a signal input for a blocking signal opening all semiconductor switches. The submodules are protected from overloading in a simpler manner by connecting a module arrester in parallel with the power converter module. The module arrester limits the power converter voltage like a valve upon exceeding a second limit voltage. The module arrester operates in blocking mode below the second limit voltage and in conducting mode above the second limit voltage. A current limiting the power converter voltage flows through the module arrester in conducting mode.

6 Claims, 5 Drawing Sheets

(56) References Cited

U.S. PATENT DOCUMENTS

| | | | |
|---|---|---|---|
| 2014/0226374 A1 | 8/2014 | Häfneer et al. | |
| 2014/0313797 A1* | 10/2014 | Davidson | H02M 7/49 363/50 |
| 2016/0365787 A1* | 12/2016 | Geske | H02H 9/041 |
| 2017/0163170 A1* | 6/2017 | Tahata | H02M 7/483 |
| 2018/0159316 A1* | 6/2018 | Aramaki | H02M 1/32 |
| 2018/0302003 A1* | 10/2018 | Mori | H02M 7/219 |
| 2019/0068076 A1* | 2/2019 | Uda | H02M 1/36 |
| 2019/0386578 A1* | 12/2019 | Kajiyama | H02M 7/1557 |

FOREIGN PATENT DOCUMENTS

| | | | |
|---|---|---|---|
| EP | 2595302 A1 | 5/2013 | |
| EP | 3068008 A1 | 9/2016 | |

\* cited by examiner

MULTIPHASE MULTILEVEL POWER CONVERTER

BACKGROUND OF THE INVENTION

Field of the Invention

The invention relates to a multiphase multilevel power converter having a phase module which has a power converter module formed from a multiplicity of two-pole submodules which are electrically connected in series and have a plurality of semiconductor switches which are connected together in series, an energy store which can be charged and discharged by the semiconductor switches, a bypass switch which short-circuits the energy store if an associated first limit voltage is exceeded, and a signal input for a blocking signal which opens all semiconductor switches of the submodule.

Power converter stations which are connected to a multiphase AC grid and are intended to generate a voltage supply with a DC voltage in the high-voltage range are known. A power converter station comprises a transformer to which the AC grid is connected on the primary side. The AC grid can be disconnected using an AC circuit breaker by means of a switch-off signal (ESOF signal, ESOF: Emergency Switch OFF). On the secondary side, the windings of the transformer are connected either in a delta circuit or in a star circuit with a star point and are connected to a power converter, often in the form of a multiphase multilevel power converter (also MMC for short: Modular Multilevel Converter). The secondary-side AC voltages of the transformer are applied to the AC voltage connections (AC connections) of said power converter and the DC voltage is available at the two DC voltage connections (DC connections) of the multilevel power converter.

The multiphase multilevel power converter has a phase module having one of the AC connections for each phase. Two power converter modules which are each connected in series with an inductance are connected to each phase module.

Each power converter module is formed from a multiplicity of two-pole submodules which are electrically connected in series and have the following: a) a plurality of semiconductor switches, for example in the form of IGBTs (Insulated Gate Bipolar Transistors), which are connected together in series, b) an energy store in the form of a capacitor which can be charged and discharged by the semiconductor switches, c) a bypass switch which short-circuits the energy store if an associated limit voltage is exceeded, d) a signal input for a blocking signal which opens all semiconductor switches (for example in the event of a fault).

The semiconductor switches may be in the form of a full-bridge circuit (VSC full-bridge circuit, VSC: Voltage Sourced Converter) or a half-bridge circuit (VSC half-bridge circuit).

The bypass switches provided for the purpose of protecting the submodules are arranged between the connection terminals of the submodules and bridge the respectively associated submodule if the limit voltage is exceeded.

A protective function of the multilevel power converter respectively detects the current flowing through the power converter modules. Serious short circuits inside the power converter are typically detected on the basis of fault currents which occur.

In order to protect the power converter, the submodules are blocked by means of a blocking signal when such fault currents occur (the semiconductors are opened) and the AC grid is disconnected by the AC circuit breaker by means of a switch-off signal (ESOF signal).

The disadvantage in this case is that the difference between the DC voltage and the impressed AC voltage is present across the power converter modules over time (from the blocking of the submodules to the opening of the AC circuit breaker). This results in charging of the capacitors of the submodules; depending on the level and duration of the voltage difference which is present, the result may be an excessive voltage increase which may be associated with the permissible voltage (the limit voltage) being exceeded in one or more submodules. Exceeding of the limit voltage of a submodule on account of overcharging in each case results in the triggering of the integrated bypass switch of the submodule which therefore fails, that is to say overcharging may result in the failure of a plurality or even all of the submodules of a power converter module.

One possible way of protecting the power converter modules from overcharging and from the associated risk of the integrated bypass switches being triggered is to increase the number of submodules in the power converter modules to such an extent that the permissible voltages (the limit voltages) of the submodules are not exceeded with a high degree of reliability. This solution is technically very costly especially since the additional submodules require a large amount of space. However, this solution functions both in VSC full-bridge power converters and in VSC half-bridge power converters.

SUMMARY OF THE INVENTION

The object of the invention is to protect the submodules of the power converter modules from overcharging and the associated risk of the integrated bypass switches being triggered, which, in addition to VSC half-bridge power converters, is also suitable for VSC full-bridge power converters.

The object is achieved by a module arrester which is connected in parallel with the power converter module and limits the power converter voltage in the manner of a valve if a second limit voltage is exceeded by virtue of the module arrester operating in the blocking mode below the second limit voltage and operating in the conducting mode above the second limit voltage, wherein a current limiting the power converter voltage flows through the module arrester in the conducting mode; the subclaims describe advantageous configurations.

The solution provides for a module arrester to be connected in parallel with the power converter module and to limit the power converter voltage in the manner of a valve if a second limit voltage is exceeded by virtue of the module arrester operating in the blocking mode below the second limit voltage and operating in the conducting mode above the second limit voltage, wherein a current limiting the power converter voltage flows through the module arrester in the conducting mode.

Triggering of the bypass switches can be reliably prevented if the second limit voltage is less than the sum of the first limit voltages of the submodules, with the result that triggering of the bypass switches is reliably prevented.

The module arrester is expediently in the form of a high cooling arrester. The high cooling arrester is designed without a housing, thus achieving better cooling and therefore a higher dissipation of heat.

It is structurally space-saving if each power converter module is formed from at most two power converter towers.

Although a configuration with more than two power converter towers can be structurally implemented, it is not space-saving.

The module arrester is expediently also installed in a suspended or standing manner beside a power converter tower or between the power converter towers.

BRIEF DESCRIPTION OF THE SEVERAL VIEWS OF THE DRAWING

The invention is described in more detail below on the basis of a drawing, in which.

DESCRIPTION OF THE INVENTION

Figure 1:
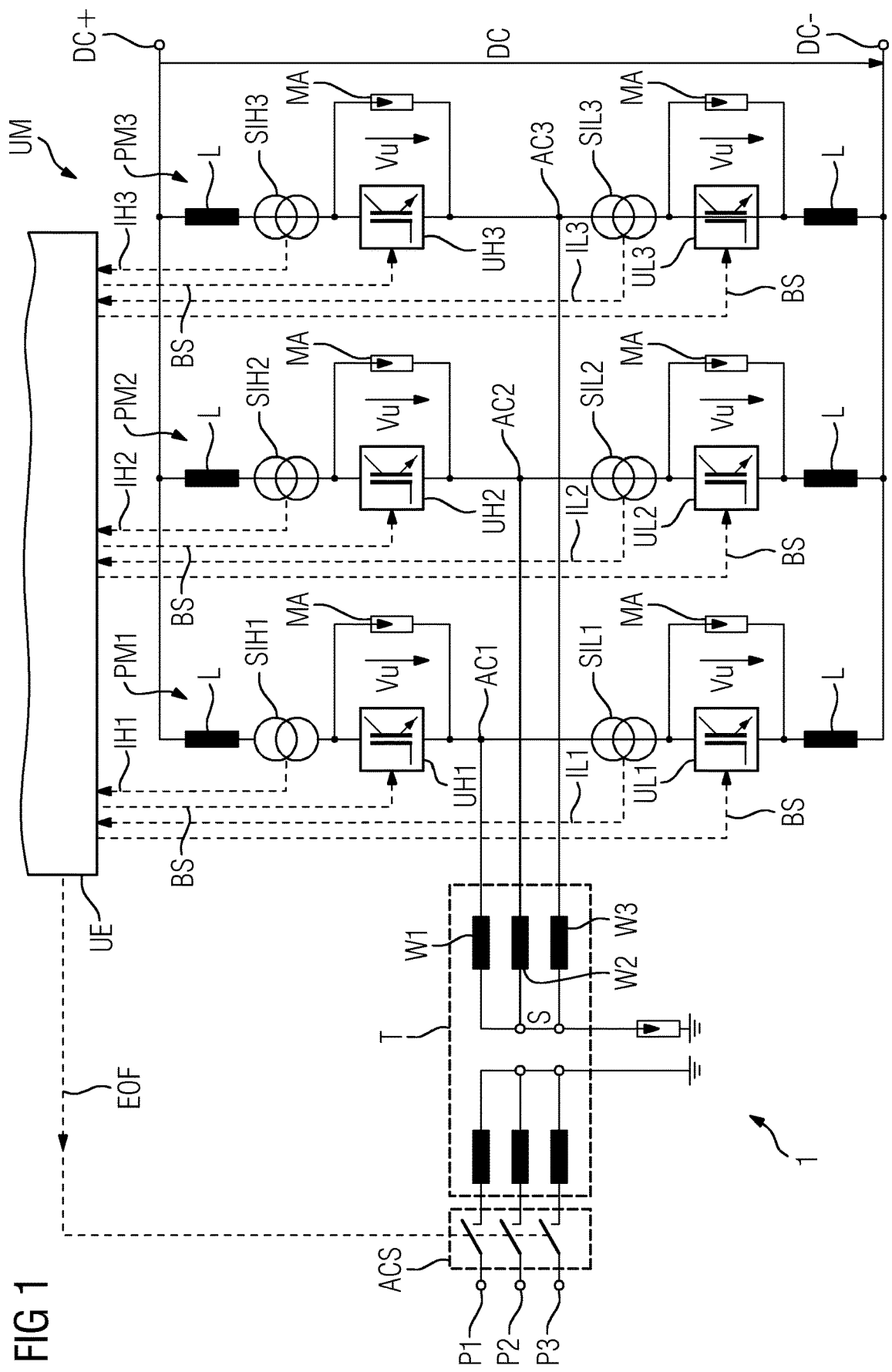
FIG. 1 schematically shows an electrical circuit of a power converter station having a three-phase multilevel power converter.

FIG. 1 schematically shows an electrical circuit 1 of a power converter station which generates a DC voltage from a three-phase AC voltage from an AC grid. For this purpose, the three phases P1, P2, P3 of the AC grid are connected to a transformer T on the primary side. The three phases P1, P2, P3 can be connected to the transformer T and disconnected from the transformer T via a main switch ACS.

The three secondary-side windings W1, W2, W3 of the transformer T are connected in a star circuit here.

The windings W1, W2, W3 are each connected to one of three input-side AC connections AC (or accordingly AC1, AC2, AC3 for the three individual AC connections) of a multiphase multilevel power converter MMC which has, on the output side, two common DC connections DC (or accordingly DC+, DC−) which are connected to DC busbars and at which a voltage DC (as the voltage supply) is available. The DC connection DC+ is the positive pole and the DC connection DC− is the negative pole of the DC voltage.

The power converter MMC has three phase modules PM1, PM2, PM3 each having one of the three AC connections AC1, AC2, AC3. The phase modules PM1, PM2, PM3 are connected in parallel and are connected to the two common DC connections DC+, DC−.

Each phase module PM1, PM2, PM3 comprises two power converter modules UL, UH (or accordingly UL1, UH1, UL2, UH2, UL3, UH3; for the bipolar configuration shown here, H stands for High and L stands for Low here) which are connected in series and are each connected to one of the two DC connections DC+, DC− via an inductance L and between which the AC connection AC1, AC2, AC3 is arranged.

Figure 2:
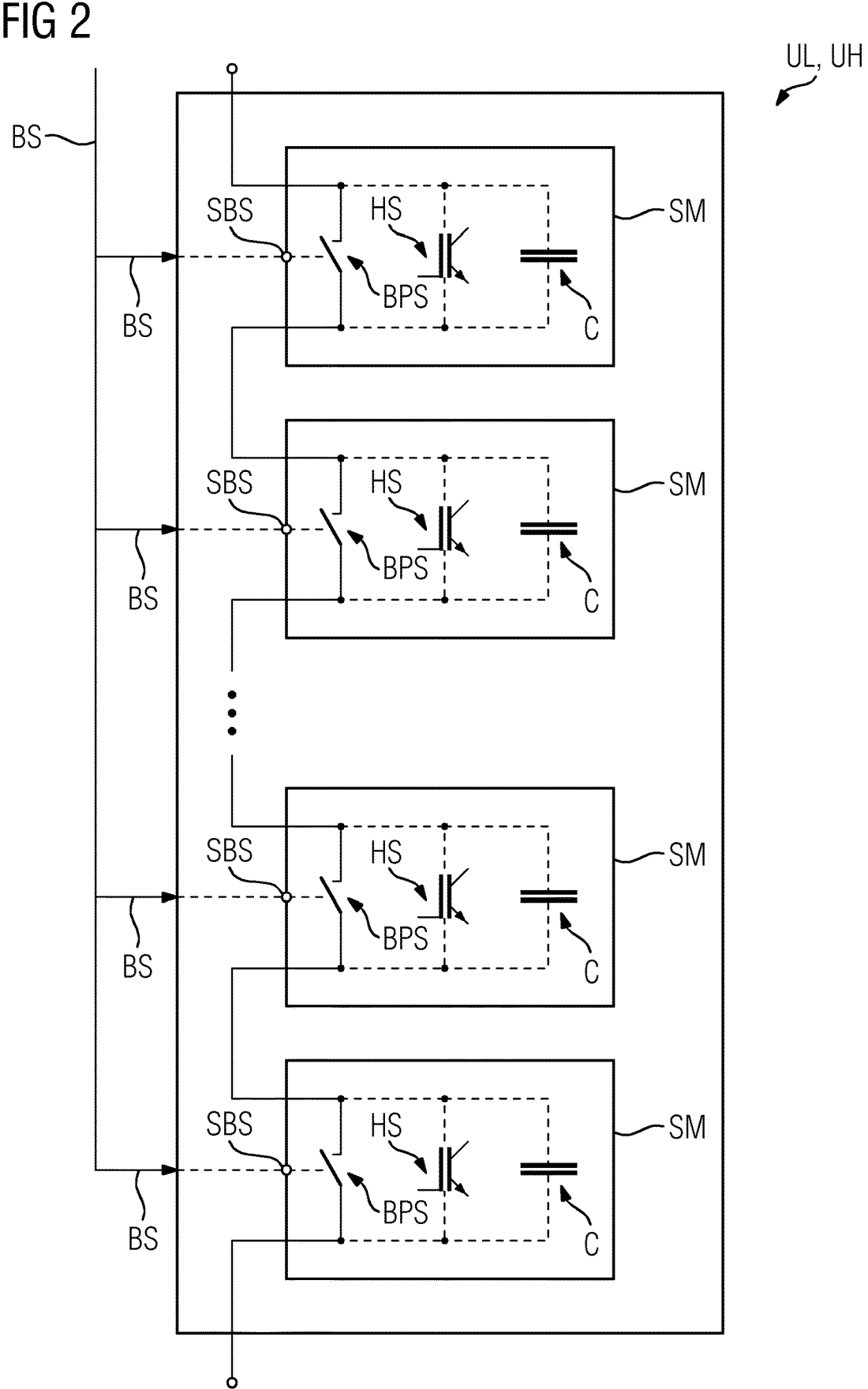
FIG. 2 shows a power converter module of the multilevel power converter according to FIG. 1.

FIG. 2 schematically shows that each power converter module UL, UH is formed from a multiplicity of two-pole submodules SM electrically connected in series. The submodules SM have controlled semiconductor switches HS which are formed here from power semiconductor components IGBT (Insulated Gate Bipolar Transistor). The semiconductor switches HS are also in the form of a full-bridge circuit (VSC full-bridge circuit, VSC: Voltage Sourced Converter), but may also be in the form of a half-bridge circuit (VSC half-bridge circuit). Furthermore, an energy store C in the form of a capacitor, which can be charged and discharged by the semiconductor switches HS, is respectively present. A bypass switch BPS short-circuits the submodule SM if an associated submodule limit voltage (the first limit voltage) is exceeded.

The semiconductor switches HS of the submodule SM can be opened (blocked) via a signal input SBS for a blocking signal BS.

Figure 3:
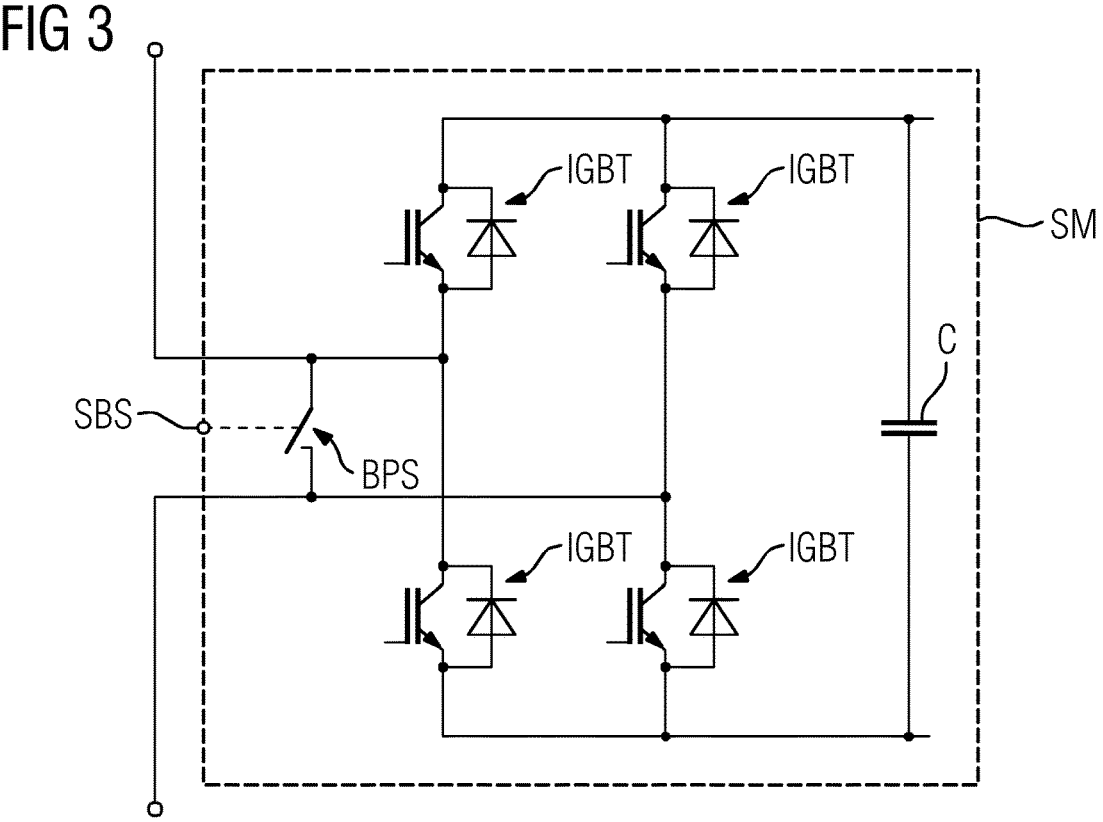
FIG. 3 shows a submodule having special power semiconductor components IGBT (Insulated Gate Bipolar Transistor) in a full-bridge circuit.
Figure 4:
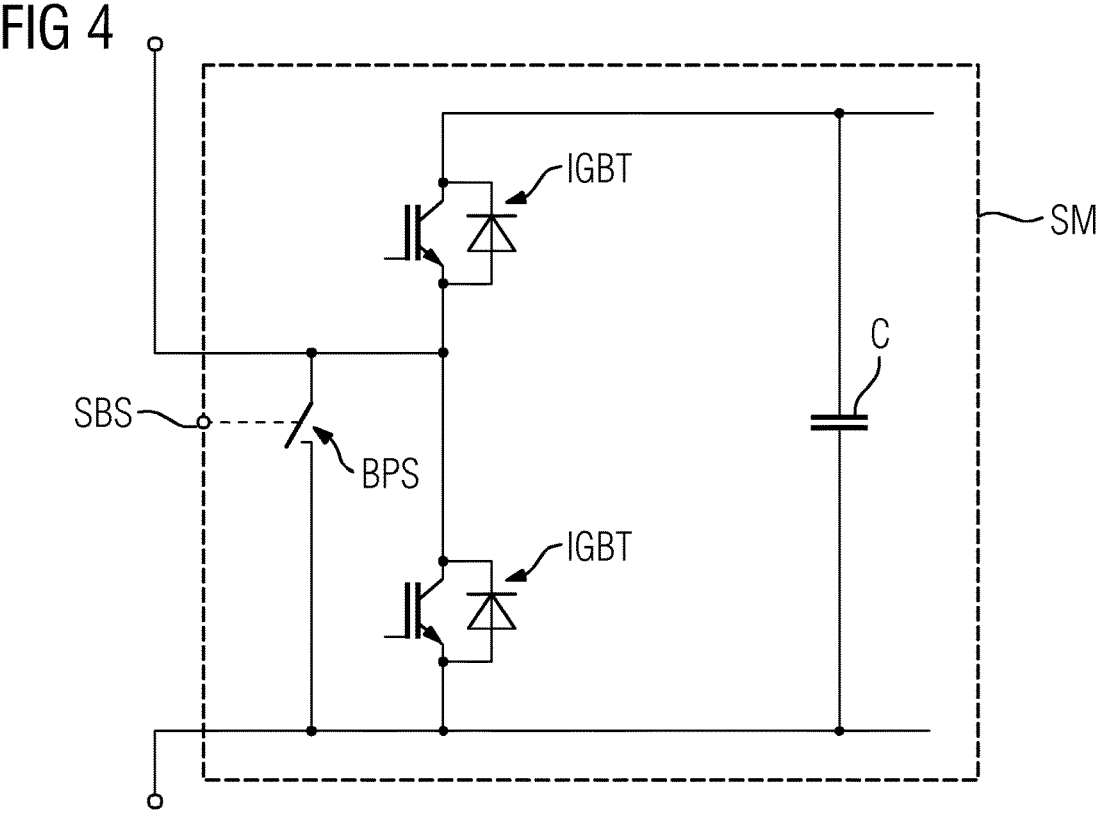
FIG. 4 shows a submodule having special power semiconductor components IGBT (Insulated Gate Bipolar Transistor) in a half-bridge circuit.

FIG. 3 shows a submodule SM having special power semiconductor components IGBT (Insulated Gate Bipolar Transistor) in a full-bridge circuit; FIG. 4 shows said components in a half-bridge circuit.

As also shown in FIG. 1, a module arrester MA is connected in parallel with each power converter module UL, UH and, as an overvoltage arrester, limits the power converter voltage VU, that is to say the voltage across the power converter module, in the manner of a valve if a power converter module limit voltage (the second limit voltage) is exceeded by virtue of the module arrester MA operating in the blocking mode above the second limit voltage and operating in the conducting mode below the second limit voltage in that a current limiting the power converter voltage VU flows through the module arrester MA.

A current sensor SIH, SIL (or accordingly SIH1, SIH2, SIH3, SIL1, SIL2, SIL3) of the multilevel power converter MMC detects the current IH, IL (or accordingly IH1, IH2, IH3, IL1, IL2, IL3) flowing through the respective power converter module UL, UH. The current IH, IL of the current sensors SIH, SIL is monitored by a monitoring unit UE.

In the event of a fault, for example in the event of serious short circuits inside the power converter, the monitoring unit UE outputs blocking signals BS to the submodules SM and a switch-off signal ESOF to the AC circuit breaker ACS, with the result that all semiconductor switches HS of the submodules and the AC circuit breaker ACS are opened.

Over time, that is to say from the opening of the submodules SM to the opening of the AC circuit breaker ACS, the AC voltage AC1, AC2, AC3 impressed on the AC side (that is to say a voltage difference) is applied to the power converter modules UL, UH (for example for approximately 120 ms). During this time, the energy stores C of the submodules SM are charged, as a result of which the voltage VU across the power converter module UL, UH and accordingly across the submodules SM is increased.

Exceeding of the submodule limit voltage as a result of overcharging is prevented by the module arrester MA which does not allow the voltage across the power converter module UM to increase above the power converter module limit voltage which, divided by the number of submodules SM of the power converter module UM, is less than the submodule limit voltage, with the result that the bypass switches BPS are not triggered in the time before the AC circuit breaker ACS is opened, that is to say, as a result of the module arrester MA, submodules SM no longer fail due to triggering of the bypass switches BS on account of overcharging.

The module arrester is therefore electrically designed in such a manner that virtually no currents flow into the module arrester before the blocking time and, at the same time, the submodule limit voltage (the maximum permitted transient voltage) for each submodule SM is not exceeded. From the blocking time on, the module arrester MA converts the associated energy into heat in the shortest possible time. On account of the short voltage separation between the voltage at the blocking time and the limit voltage, the configuration is effected with a high cooling arrester (HCA).

Figure 5:
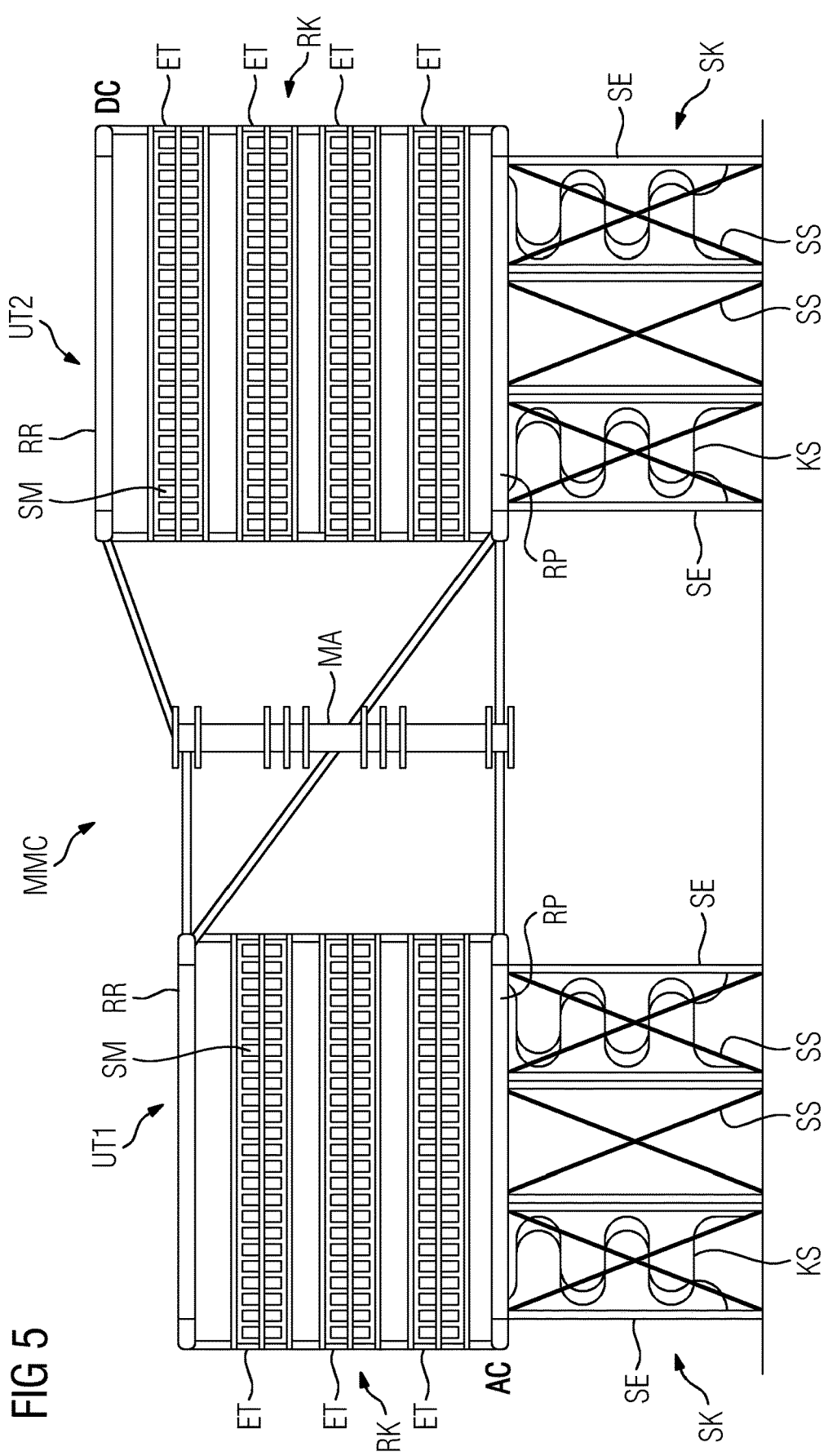
FIG. 5 shows a front view of a structural arrangement of a power converter module having two power converter towers and a module arrester.

FIG. 5 shows a front view of the structural arrangement of a power converter module UM formed from two power converter towers UT1, UT2. Each power converter tower UT1, UT2 has a supporting structure SK at the bottom for the electrically insulated mounting of a vertical frame structure RK with levels ET arranged above one another on a solid substrate.

Referring to FIG. 5, the frame structure RK has three levels ET on the left-hand side and four levels ET on the right-hand side on which submodules SM of the power converter module UM are respectively arranged laterally beside one another according to the sequence in the series circuit and are electrically connected to one another. The rows of submodules of directly adjacent levels of an individual power converter tower UT1, UT2 and the two power converter towers UT1, UT2 are likewise accordingly electrically connected in order to form the overall series circuit.

Tubular frames RR are situated above and below the three and four levels ET as shielding.

The supporting structure has supporting elements SE and tensioning cables SS which provide the supporting structure SK with sufficient stability and elasticity with respect to vibrations. A coolant is supplied to the submodules SM for cooling via tubes KS.

A module arrester MA, here in a suspended design by way of example, is arranged between the two power converter towers UT1, UT2; a standing design is also possible in principle. The module arrester MA is in the form of a high cooling arrester (overvoltage arrester) and is therefore designed without a housing for its improved cooling and therefore for improving its thermal stability.

Figure 6:
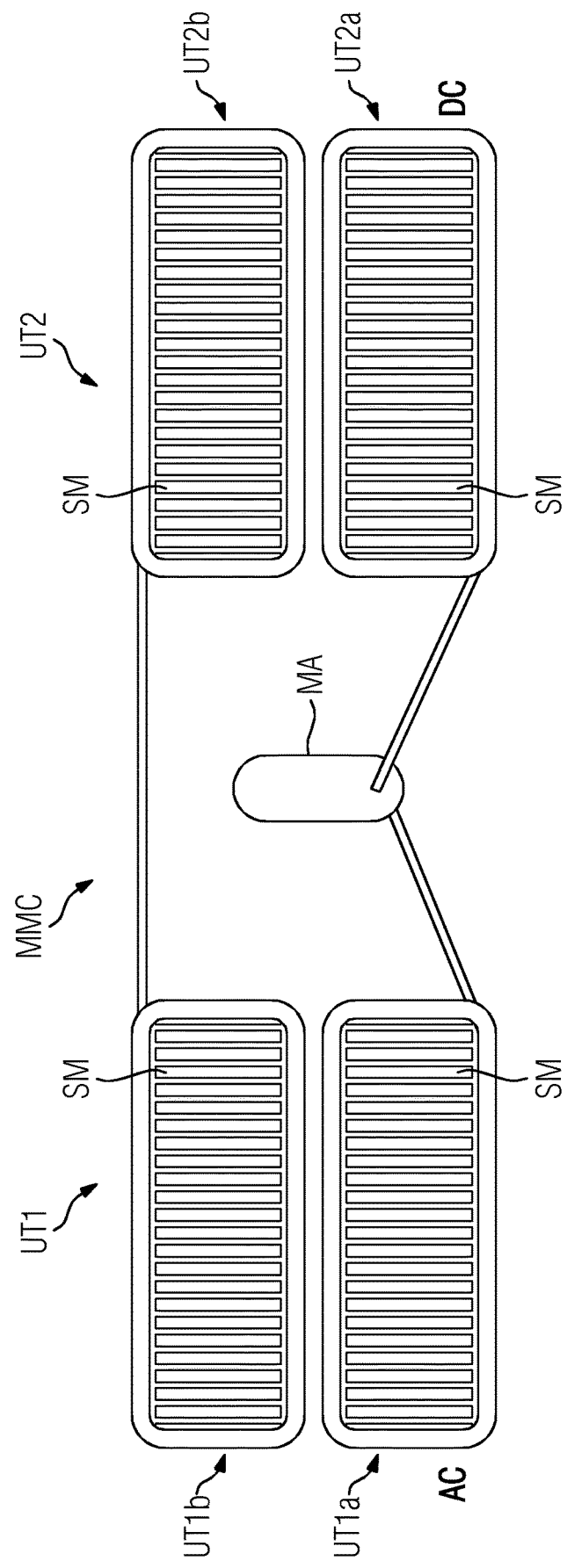
FIG. 6 shows a plan view of the structural arrangement according to FIG. 5.

FIG. 6 shows the plan view, associated with FIG. 5, of the power converter module UM with the two power converter towers UT1, UT2 and the module arrester MA. It is seen that each of the power converter towers UT1, UT2 is constructed from two half-towers UT1a, UT1b, UT2a, UT2b.

As seen in FIGS. 5 and 6, the two power converter towers UT1, UT2 are arranged beside one another. The module arrester MA is laterally directly beside each of the two power converter towers UT1, UT2 and, in the case of two power converter towers UT1, UT2, is directly between the two power converter towers UT1, UT2 here. Directly beside a power converter tower UT1, UT2 in the sense that no further electrical components are arranged in between.

The invention claimed is:

1. A multiphase multilevel power converter comprising:
 a phase module including a power converter module formed of a multiplicity of two-pole submodules being electrically connected in series, said multiplicity of two-pole submodules each including:
   a) a plurality of semiconductor switches connected together in series,
   b) an energy storage device to be charged and discharged by said plurality of semiconductor switches,
   c) a bypass switch short-circuiting said energy storage device upon exceeding an associated first limit voltage,
   d) a signal input for a blocking signal opening all of said plurality of semiconductor switches of said two-pole submodule; and
 a module arrester connected in parallel with said power converter module and acting as a valve limiting a power converter voltage upon exceeding a second limit voltage, sad module arrester operating in a blocking mode below said second limit voltage and operating in a conducting mode above said second limit voltage, and a current limiting said power converter voltage flowing through said module arrester in said conducting mode.

2. The multilevel power converter according to claim 1, wherein said second limit voltage is less than a sum of said first limit voltages of said submodules, for reliably preventing triggering of said bypass switches.

3. The multilevel power converter according to claim 1, wherein said module arrester is constructed without a housing.

4. The multilevel power converter according to claim 1, wherein said module arrester is a high cooling arrester.

5. The multilevel power converter according to claim 1, wherein said power converter module is formed of at most two power converter towers.

6. The multilevel power converter according to claim 5, wherein said module arrester is installed in a suspended or standing manner beside one power converter tower or between two power converter towers.

\* \* \* \* \*